United States Patent
Okura et al.

(10) Patent No.: US 9,914,871 B2
(45) Date of Patent: Mar. 13, 2018

(54) BALL SEALER FOR HYDROCARBON RESOURCE RECOVERY, METHOD FOR MANUFACTURING SAME, AND METHOD FOR TREATING BOREHOLE USING SAME

(71) Applicant: Kureha Corporation, Tokyo (JP)

(72) Inventors: Masayuki Okura, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 15/102,070

(22) PCT Filed: Dec. 15, 2014

(86) PCT No.: PCT/JP2014/083152
§ 371 (c)(1),
(2) Date: Jun. 6, 2016

(87) PCT Pub. No.: WO2015/098597
PCT Pub. Date: Jul. 2, 2015

(65) Prior Publication Data
US 2016/0312111 A1    Oct. 27, 2016

(30) Foreign Application Priority Data
Dec. 26, 2013    (JP) .................. 2013-268415

(51) Int. Cl.
*C09K 8/70*    (2006.01)
*E21B 23/04*    (2006.01)
(Continued)

(52) U.S. Cl.
CPC .............. *C09K 8/70* (2013.01); *B29B 11/08* (2013.01); *B29C 45/14819* (2013.01);
(Continued)

(58) Field of Classification Search
CPC ...... C09K 8/70; B29B 11/08; B29C 45/14819; B29C 45/14073; C08J 7/047;
(Continued)

(56) References Cited

U.S. PATENT DOCUMENTS

| 4,102,401 A | 7/1978 | Erbstoesser |
| 4,407,368 A | 10/1983 | Erbstoesser |

(Continued)

FOREIGN PATENT DOCUMENTS

| WO | WO/2013/053057 A1 | 4/2013 |
| WO | WO/2013/183363 A1 | 12/2013 |

OTHER PUBLICATIONS

International Search Report of PCT/JP2014/083152 dated Mar. 24, 2015.

*Primary Examiner* — Wei Wang
(74) *Attorney, Agent, or Firm* — Birch, Stewart, Kolasch & Birch, LLP

(57) ABSTRACT

A ball sealer for hydrocarbon resource recovery, characterized by being obtained by coating a spherical core that comprises at least one layer comprising a disintegrable aliphatic polyester resin with a resin material that has higher impact resistance than the aliphatic polyester resin and by having a diameter of not less than approximately 25 mm (1 inch). This ball sealer has a large diameter, retains the property of being disintegrable after fracturing, and has impact resistance which makes the ball withstand high-velocity loading. The sealer is suitable for use in hydraulic fracturing, which is commonly used for recovering hydrocarbon resources including petroleum and gases.

This large-diameter ball sealer can be efficiently formed with high dimensional accuracy by a method including at least one insert injection molding step.

11 Claims, 3 Drawing Sheets

(51) Int. Cl.
- *E21B 43/26* (2006.01)
- *B29B 11/08* (2006.01)
- *E21B 33/12* (2006.01)
- *B29C 45/14* (2006.01)
- *C08J 7/04* (2006.01)
- *B29K 67/00* (2006.01)
- *B29L 9/00* (2006.01)
- *B29L 31/26* (2006.01)

(52) U.S. Cl.
CPC .............. *C08J 7/047* (2013.01); *E21B 23/04* (2013.01); *E21B 33/12* (2013.01); *E21B 43/26* (2013.01); *B29K 2067/00* (2013.01); *B29L 2009/005* (2013.01); *B29L 2031/26* (2013.01); *C08J 2367/04* (2013.01); *C08J 2467/04* (2013.01)

(58) Field of Classification Search
CPC ... C08J 2367/04; C08J 2467/04; E21B 23/04; E21B 33/12; E21B 43/26; E21B 34/14; B29K 2067/00; B29K 2067/043; B29K 2105/12; B29L 2009/005; B29L 2031/26; Y10T 428/31786

See application file for complete search history.

(56) References Cited

U.S. PATENT DOCUMENTS

| | | | |
|---|---|---|---|
| 4,410,387 | A | 10/1983 | Halkerston et al. |
| 4,505,334 | A | 3/1985 | Doner et al. |
| 7,647,964 | B2 | 1/2010 | Akbar et al. |
| 2005/0205265 | A1 | 9/2005 | Todd et al. |
| 2005/0205266 | A1 | 9/2005 | Todd et al. |
| 2007/0169935 | A1 | 7/2007 | Akbar et al. |
| 2009/0101334 | A1 | 4/2009 | Baser et al. |
| 2010/0132959 | A1 | 6/2010 | Tinker |
| 2011/0036592 | A1 | 2/2011 | Fay |
| 2011/0076319 | A1* | 3/2011 | Orlowski .............. A61L 31/022 424/426 |
| 2012/0181032 | A1 | 7/2012 | Naedler et al. |
| 2014/0246209 | A1* | 9/2014 | Themig .................. E21B 43/14 166/374 |
| 2015/0096741 | A1 | 4/2015 | Okura et al. |

\* cited by examiner

BALL SEALER FOR HYDROCARBON RESOURCE RECOVERY, METHOD FOR MANUFACTURING SAME, AND METHOD FOR TREATING BOREHOLE USING SAME

TECHNICAL FIELD

The present invention relates to a ball sealer as one type of tool for forming or maintaining a downhole (or borehole) for recovery of hydrocarbon resources such as petroleum and gas, and particularly relates to a ball sealer (a so-called frac ball) suitable for formation of a frac plug or frac sleeve (plug or pipe for hydraulic fracturing) as such a tool, and a method for manufacturing the same, and a method for treating a borehole using the same.

BACKGROUND ART

A downhole (borehole) is provided for recovery of hydrocarbon resources (typically called "petroleum" hereinafter) from a subterranean formation containing hydrocarbon resources such as petroleum and gas, but to accelerate the formation and maintenance thereof as well as resource recovery, there are many tools such as frac plugs, bridge plugs, ball sealers, isolation plugs, and packers (comprehensively called "downhole tools" hereinafter) that are disposed of by being disintegrated or dropped in the downhole as-is without being retrieved above ground after use (for examples of such downhole tools and modes of use thereof, see Patent Documents 1 to 6, for example). Therefore, for such disposable tools, it has also been recommended to form the entire tool or a component that constitutes a binding part for accelerating disintegration (component for downhole tool) from a disintegrable polymer. Examples of such disintegrable polymers include polysaccharides such as starch and dextrin; animal protein polymers such as chitin and chitosan; aliphatic polyesters such as polylactic acid (PLA, typically poly-L-lactic acid (PLLA)), polyglycolic acid (PGA), polybutyric acid, and polyvaleric acid; polyamino acids; polyethylene oxide; and the like (Patent Documents 1 and 2). Furthermore, it has also been proposed to pour in a fluid called a pad, such as diesel oil, on top of the frac balls after fracturing using frac balls made from a rigid resin such as polystyrene, to accelerate ball disintegration after fracturing (Patent Document 3).

To recover hydrocarbon resources (typically "petroleum") from a nearby subterranean formation via a formed downhole, hydraulic fracturing is often employed.

Conventionally, as described above, there were many applications in which a ball sealer as an example of a downhole tool was used in hydraulic fracturing to block perforations directly, as a blocking material (also called perforation balls) for suppressing inflow of excess process water into perforations for recovering petroleum formed using a perforating gun or the like in the subterranean formation (for example, Patent Documents 4 and 5). As ball sealers used in such applications, to improve sealing ability by means of form-fitting deformation into perforations of indeterminate shape as necessary, relatively small ball sealers with a diameter of 16 to 32 mm (0.625 to 1.25 inches; Patent Document 4, column 2, lines 46 to 48) made from a non-disintegrable material such as aluminum or a non-disintegrable resin such as nylon or phenol resin which has been coated with a rubbery surface layer were used. Furthermore, to improve form-fitting deformability into perforations of indeterminate shape, perforation balls having a laminate structure of three or more layers have also been proposed (Patent Document 5).

However, the use of larger-diameter ball sealers as some of the material constituting the frac plug or frac sleeve (plug or pipe for hydraulic fracturing) used in hydraulic fracturing has also been recently proposed. More specifically, a high-pressure water stream is introduced into partitioned process areas by disposing ball seats having an opening at the center, together with frac plugs with incorporated ball sealers for closing the opening, in prescribed locations of the formed downhole, and the water stream is made to act in a direction straight through to the downhole, and the subterranean formation layer is fractured to form perforations for recovering petroleum (for example, Patent Documents 1 to 3).

Alternatively, a method has been proposed wherein a pipe (frac sleeve), in which a plurality of ball seats have been incorporated and disposed with separation therebetween, is inserted into a downhole, and then, in this frac sleeve, a perforation formation operation is continuously performed by successively fracturing the subterranean formation into which ball sealers are supplied to and disposed in the ball seats and then introducing a high-pressure water stream (for example, Patent Documents 6 and 3).

As the ball sealers (also called frac balls) that constitute part of such a frac plug or frac sleeve, in addition to those having the same diameter as the perforation balls used as direct blocking material of the perforation balls generally described above (for example, a diameter of approximately 25 to 100 mm (1 to 4 inches)), those having a larger diameter are often required. Additionally, frac balls require different deformation resistance than perforation balls due to the usage mode thereof. Specifically, in hydraulic fracturing treatment (fracturing) of a subterranean formation, since high water pressure of 7 to 70 MPa (1000 to 10,000 psi) acts on the frac ball, rigidity is required so that breakage or excessive deformation does not occur in order to assure sealability between it and the ball seat. In particular, as shown in Patent Documents 3 and 6, in order to form as many fracturing zones as possible in a sleeve (cylindrical pipe) inserted in a downhole, the difference between the opening diameter of the seat seats that form adjacent seal parts and the diameter of the frac balls must be as small as possible, and the seal width (overlap, difference in radius) between the ball that forms one seal part and the seat must be held to a minimum. Naturally, a frac ball requires deformation resistance (rigidity), which is completely the opposite of the deformability of a perforation ball. For such reasons, conventionally, metal frac balls were mainly used, but it has also been proposed to use resin frac balls to save the labor of retrieval after fracturing (Patent Document 3).

In contrast, the present inventors found that a disintegrable resin frac ball containing, at least in part, an aliphatic polyester resin of which the rigidity (deformation resistance) has been improved by blending a reinforcing material as necessary can be used at least in conventional hydraulic fracturing. It has been established, however, that there are problems in further improving productivity. Specifically, in order to supply and dispose a frac ball of a prescribed size in a ball seat at a corresponding depth reaching 1,000 to 2,000 m from the ground surface, the frac ball must be conveyed over a certain period of time by a high-pressure water stream. This period of time depends completely on the flow rate of the high-pressure water stream, and at a flow rate of not greater than the conventional approximately 4 m/sec (for example, a flow rate of 15 barrels/min for a 4.5-inch pipe), the frac ball containing disintegrable resin described above can be used, but when a higher-rate high-pressure water stream is employed, there is risk that the frac ball will crack and sealing ability will be lost.

CITATION LIST

Patent Literature

Patent Document 1: US 2005/0205266A Specification
Patent Document 2: US 2005/0205265A Specification
Patent Document 3: US 2012/0181032A Specification
Patent Document 4: US 7647964B Specification
Patent Document 5: US 2009/0101334A Specification
Patent Document 6: US 2010/0132959A Specification

SUMMARY OF INVENTION

Technical Problem

In light of the above circumstances in background art, a primary object of the present invention is to provide a ball sealer for hydrocarbon resource recovery having a relatively large diameter and improved impact resistance, containing, at least in part, disintegrable aliphatic polyester resin.

Further objects of the present invention are to provide a manufacturing method that can form the aforementioned ball sealer for hydrocarbon resource recovery with good dimensional precision using a relatively simple process, and a method for treating a borehole using the ball sealer for hydrocarbon resource recovery.

Solution to Problem

The ball sealer for hydrocarbon resource recovery of the present invention is characterized by being obtained by coating a spherical core that comprises at least one layer comprising a disintegrable aliphatic polyester resin with a resin material that has higher impact resistance than the aliphatic polyester resin, and the diameter being not less than approximately 25 mm (1 inch). According to a preferred aspect, a polyglycolic acid resin is used as the disintegrable aliphatic polyester resin.

Furthermore, the method for manufacturing a ball sealer of the present invention is characterized by comprising coating a spherical core that comprises at least one layer comprising a disintegrable aliphatic polyester resin with a resin material that has higher impact resistance than the aliphatic polyester resin, to give a diameter of not less than approximately 25 mm (1 inch). According to a preferred aspect, the ball sealer is formed by a method comprising at least one insert injection molding step, in which the aforementioned spherical core or an inside core constituting the interior thereof is disposed as an insert, and a coating resin or outside core resin is injection-molded.

Furthermore, the borehole treatment method of the present invention is a method that comprises a fracturing cycle, in which a frac ball is supplied together with process fluid to a ball seat having an opening provided inside a long frac sleeve inserted into a borehole formed in a subterranean formation, and by sealing the opening of the ball seat disposed at a prescribed location, it forms a seal part and blocks the process fluid, and by causing the process fluid to spurt out from openings provided in the frac sleeve walls directly above the seal part, the borehole inner wall adjacent to the openings is drilled or completed, thereby forming perforations, and after that, the frac ball is disintegrated in situ; the method being characterized by using the ball sealer of the present invention as the frac ball. According to a preferred aspect, it is a method in which a fracturing cycle, in which a plurality of ball seats of gradually larger opening diameter are provided at prescribed intervals from the downstream side to the upstream side in the elongation direction in a long frac sleeve and a plurality of frac balls of gradually larger diameter are sequentially supplied together with process fluid, a seal part is formed, and perforations are formed, is sequentially performed from the downstream side to the upstream side, wherein the ball sealer of the present invention is used as at least some of the plurality of frac balls.

DESCRIPTION OF EMBODIMENTS

The present invention will be described in detail hereinafter using preferred embodiments thereof.

As described above, a ball sealer for hydrocarbon resource recovery of the present invention is characterized by being obtained by coating a spherical core that comprises at least one layer comprising a disintegrable aliphatic polyester resin with a resin material that has higher impact resistance than the aliphatic polyester resin, and the diameter being not less than approximately 25 mm (1 inch).

Note that in the present specification, the term "disintegration" from which "disintegrable" is derived indicates various processes whereby the sealing function against a corresponding ball seat is no longer maintained, due to significant changes in the physical characteristics of the frac balls resulting from the various materials constituting the ball sealer (frac balls) of the present invention changing significantly at the frac ball environment temperature (normally from 0 to 200° C.) and under the surrounding fluid conditions after fracturing when the heat of the subterranean formation is also added. Those processes are not limited to (bio)degradation, which is generally known in regard to aliphatic polyesters, and also include disintegration, dissolution, and delamination, but are not limited thereto.

Figure 1:
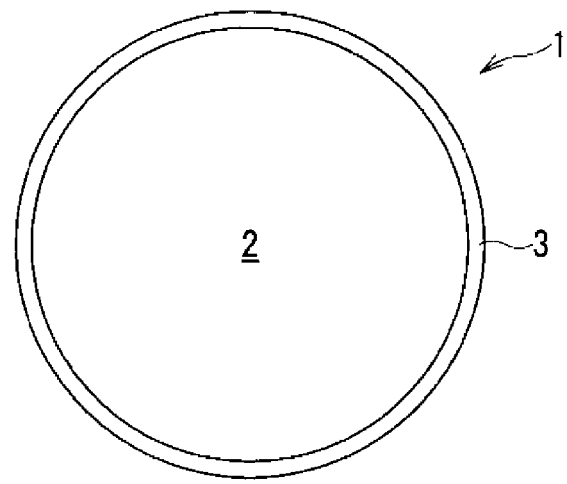
FIG. 1 is a schematic cross-sectional view of an aspect of a ball sealer (frac ball) of the present invention.
Figure 2:
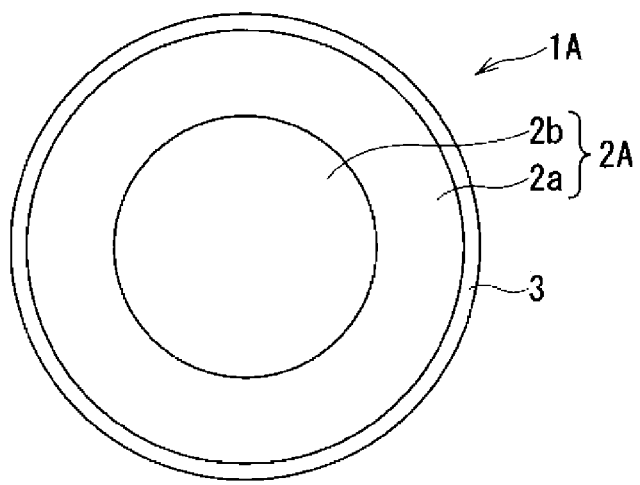
FIG. 2 is a schematic cross-sectional view of another aspect of the ball sealer (frac ball) of the present invention.

FIG. 1 is a schematic cross-sectional view of the most basic aspect of the ball sealer (frac ball) of the present invention. A frac ball 1 is formed by coating a core 2, made from a single resin material, with a resin material layer 3 having higher impact resistance than the core 2. FIG. 2 illustrates another aspect, in which a frac ball 1A is formed by coating a core 2A, having a two-layer structure of an outside core 2a and an inside core 2b, with a resin material layer 3 having higher impact resistance than the outside core 2a.

The resin material that constitutes the core 2 of FIG. 1 or the outside core 2a of FIG. 2 must have, at least at the frac fluid temperature (normally from 10 to 121° C.), compressive strength (ASTM-D-695) of not less than 30 MPa, preferably not less than 50 MPa, and more preferably not less than 70 MPa, and tensile strength (ASTM-D-882) of not less than 10 MPa, preferably not less than 30 MPa, and more preferably not less than 50 MPa. Such mechanical strength can be established even with a polyglycolic acid (PGA) alone, but in the case of other aliphatic polyester resins such as polylactic acid, it is preferably reinforced by blending a filler such as short fibers or an inorganic filler. This effect is similar for PGA resins as well, and blending of a filler is preferred when particularly high mechanical strength is desired. In the present invention, because impact strength is improved by the coating layer 3, the impact strength of the core 2 (or 2a) need not be particularly regulated, but a coating layer 3 having a V-notched Izod impact strength according to ASTM-D-256 of approximately 10 to 100 J/m is generally used.

A polyglycolic acid resin (PGA resin) that is preferred as the aliphatic polyester resin also has the characteristics of excellent initial mechanical strength such as the highest level of compressive strength in thermoplastic resins, and has a large effect of suppressing the thickness reduction rate in water due to being a material in which short fiber reinforcing material has been blended. Examples of the polyglycolic acid resin (PGA resin) include glycolic acid homopolymers made from only glycolic acid (—OCH$_2$—CO—) used as the repeating unit (that is, polyglycolic acid (PGA)), as well as glycolic acid copolymers containing other monomer (comonomer) units, preferably hydroxycarboxylic acid units such as lactic acid, in a proportion of not greater than 50% by weight, preferably not greater than 30% by weight, and more preferably not less than 10% by weight. By using a copolymer that contains other monomer units, the hydrolysis rate, crystallinity, and the like of the polyglycolic acid resin can be adjusted to a certain degree.

A polyglycolic acid resin having a weight average molecular weight of not less than 70,000, and preferably from 100,000 to 500,000, is used. When the weight average molecular weight is less than 70,000, the initial mechanical strength characteristics required in frac balls are lost. On the other hand, when the weight average molecular weight is greater than 500,000, it is not preferred because molding processability is adversely affected. In consideration of injection molding characteristics, melt viscosity measured at the melting point plus 50° C. (270° C. for polyglycolic acid alone) at a shear rate of 120 sec$^{-1}$ (JIS K 7199) is preferably in the range of 20 to 2,000 Pa·s, and particularly preferably in the range of 200 to 1,500 Pa·s.

The PGA resin that constitutes the core 2 (FIG. 1) or outside core 2a (FIG. 2) is normally used alone, but other thermoplastic resins such as other aliphatic polyesters, aromatic polyesters, and elastomers may also be blended with the objective of controlling its disintegrability and the like. The added amount thereof is an amount that does not hinder the polyglycolic acid resin from existing as a matrix resin necessary in order to exhibit its characteristic rigidity (compression resistant strength) and linear thickness decrease rate characteristics. More specifically, the added amount should be held to less than 30% by weight, preferably less than 20% by weight, and more preferably less than 10% by weight.
(Filler)
Examples of short fiber reinforcing materials as preferred examples of the filler (core reinforcing material) include inorganic fibrous substances such as glass fibers, carbon fibers, asbestos fibers, silica fibers, alumina fibers, zirconia fibers, boron nitride fibers, silicon nitride fibers, boron fibers, and potassium titanate fibers; metal fibrous substances such as stainless steel, aluminum, titanium, steel, and brass; and organic fibrous substances with a high melting point such as aramid fibers, kenaf fibers, polyamides, fluorine resins, polyester resins, and acrylic resins. Among these, those having a short diameter (D) from 0.1 to 1,000 μm, more preferably from 1 to 100 μm, and particularly preferably from 5 to 20 μm, and having an aspect ratio (L/D) from 2 to 1,000, more preferably from 3 to 300, and particularly preferably from 3 to 150, are used so as to provide a composition suitable for melt-molding. Typically, those fibers called milled fibers or chopped fibers are preferably used.

Examples of other fillers that function as reinforcing materials include mica, silica, talc, alumina, kaolin, calcium sulfate, calcium carbonate, titanium oxide, ferrite, clay, glass powder, zinc oxide, nickel carbonate, iron oxide, quartz powder, magnesium carbonate, barium sulfate, and the like.

When a reinforcing material is blended, it is blended in a proportion of preferably from 2 to 100 parts by weight, more preferably from 10 to 90 parts by weight, and particularly preferably from 20 to 80 parts by weight, relative to 100 parts by weight of the resin that constitutes the core 2 (FIG. 1) or the outside core 2a (FIG. 2). When it is less than 2 parts by weight, the effect of blending is poor, and when it is greater than 100 parts by weight, there is risk that it will be difficult to uniformly disperse the reinforcing material by melt-kneading.

The multilayer core structure of FIG. 2 is normally preferable to the single-layer core structure of FIG. 1. The first reason a multilayer core structure is preferred is that it enables use of separate materials on the inside and the outside. The high mechanical strength required in the core 2 lies especially in the surface layer thereof (the outside core 2a in the example of FIG. 2), and in the present invention, a disintegrable aliphatic polyester resin, preferably PGA resin, in which a filler has been blended as necessary is used. In contrast, the inside core 2b, which has low requirements for mechanical strength, may be formed of another general (bio)degradable resin, for example, aliphatic polyesters other than PGA resin, such as polylactic acid (PLA, typically poly-L-lactic acid (PLLA)), polybutyric acid, and polyvaleric acid; polysaccharides such as starch and dextrin; animal protein polymers such as chitin and chitosan; polyamino acids; polyethylene oxide; and the like. Alternatively, disintegrable materials in which, using these disintegrable resins as a binder, a filler is blended in a relatively large quantity as an extender having almost no reinforcing effect, and disintegrable non-resin materials which have few adverse effects on the natural environment may be used. Furthermore, in either case, whether the core is a single layer or multiple layers (FIG. 2), a hollow spherical core may be used as the single-layer core 2 (FIG. 1) or the inside core 2b (FIG. 2), while keeping in mind the need to maintain mechanical strength, typified by compressive strength, of the frac ball as a whole.

The frac ball of the present invention is formed by coating the above-described single-layer core 2 (FIG. 1) or multi-layer core 2A (FIG. 2) with a resin layer 3 made from a resin material having impact resistance strength greater than that of the disintegrable aliphatic polyester resin in which filler is blended as necessary that constitutes the core. It is preferable to select and use a coating layer material having sufficient impact resistance in accordance with the conveyance speed during use.

The V-notched Izod impact strength according to ASTM-D-256 is used as an indicator of the impact resistance required in the coating layer material.

Specifically, the required impact resistance of the ball coating layer material may differ depending on usage temperature and seat shape, but as V-notched Izod strength, not less than 20 J/m is preferred, not less than 50 J/m is more preferred, and not less than 100 J/m is particularly preferred. Since the maximum test strength has been set at 500 J/m, when a sample "does not break" in an Izod impact test, it is interpreted as having an impact strength greater than the value given above. The coating layer 3 material preferably has higher impact strength than the core 2 (or outside core 2a), preferably not less than 10 J/m, and particularly not less than 30 J/m.

The impact resistance or impact mitigation characteristics required in the coating resin layer 3 may vary depending on the relative relationship with the disintegrable aliphatic polyester resin that constitutes the core 2 or its surface layer 2a. For example, PGA resin, which is an excellent core constituent material having high hardness (compressive strength), has the tendency of low impact resistance strength due to its hardness, but aliphatic polyester resins other than PGA resin, such as polylactic acid resin which is relatively soft compared to PGA resin, is potentially a constituent material of the coating resin layer 3 having impact mitigation ability for coating a core made from PGA resin. Impact-resistant grade resin is particularly preferred.

Typical impact-resistant resin materials are rubbers and elastomers, but since they have excessive elastic deformability when used alone, they are used only in a limited thickness, for example, from 0.05 to 10 mm, when used as the surface layer material of frac balls, which require dimensional stability. As a coating layer 3 resin material that has both deformation resistance and impact resistance, a mixture of an aliphatic polyester (preferably PGA resin) and an elastomer is used, and a mixture of an aliphatic polyester resin in which a relatively small amount of elastomer, from 1 to 30% by weight and preferably from 2 to 20% by weight, has been blended is particularly preferred. Specific examples of the elastomer include styrene-based elastomers, olefin-based elastomers, vinyl chloride-based elastomers, urethane-based elastomers, polyester-based elastomers, amide-based elastomers, acrylic rubber-based core/shell-type elastomers, and the like. Most preferred among these are polyester-based elastomers made by combining a polyester hard segment and a polyether or polyester soft segment, which have good miscibility with aliphatic polyesters. Examples of commercially available products thereof include "Hytrel" manufactured by DuPont, which is a block copolymer of polybutylene terephthalate and polyether, and "Ecoflex" manufactured by BASF, which is a biodegradable polybutylene adipate-terephthalate block copolymer.

Blending of a short fiber reinforcing material is preferred in order to improve the impact resistance of the coating layer, and it is preferably blended such that the proportion of reinforcing material relative to the entire coating layer in which the reinforcing material has been blended is from 1 to 50% by weight.

In addition to the fillers (reinforcing materials) described above, various additives, such as thermal stabilizers, photostabilizers, plasticizers, desiccants, waterproofing agents, water-repellent agents, lubricants, degradation accelerators, degradation inhibitors, and the like, may also be added as necessary to the resin material that constitutes the core 2, the outside core 2a, the inside core 2b, or the coating layer 3, within a range consistent with the objectives of the present invention.

The frac ball of the present invention is formed as a sphere having a diameter as a whole, including the coating layer 3, of not less than approximately 25 mm (1 inch), and preferably not less than 38 mm (1.5 inches). (Furthermore, the upper limit of diameter is generally not greater than approximately 127 mm (5 inches), and preferably not greater than 114 mm (4.5 inches).) The diameter of the core 2 or the core 2A also varies considerably depending on the materials of the core 2 (or 2A) and the coating layer 3, but, for example, it is from 80 to 99.9% and preferably approximately from 90 to 99.9% of the frac ball diameter, and is not less than 20 mm and preferably not less than 25 mm.

The remainder is the coating layer, of which the thickness may also vary widely depending on the material and the extent of the need to improve impact resistance strength, but it varies widely from 0.05 to 20 mm, preferably from 0.1 to 10 mm.

To form such large frac balls with the required high dimensional precision, a method of performing injection molding using an insert in at least one step, developed in accordance with the method disclosed in the specification of WO2014/024827A (included in the specification of the present application as reference), is preferred.

Specifically, when a single-layer core 2 reaching a diameter of, for example, 1 inch, is integrally molded by, for example, injection molding, shrinkage occurs and high dimensional precision is difficult to obtain due to heat shrinkage after injection molding, which is also seen in general thermoplastic resins, and due to shrinkage accompanying crystallization of aliphatic polyester, which is generally crystalline although in varying degrees. Therefore, regardless of whether the same resin material or different resin materials are used in the outside core 2a and the inside core 2b, a problematic decrease in dimensional precision of the outside core 2a can be markedly reduced when the core 2A is formed by the molding method of the present invention, which uses the inside core 2b as an insert.

An aspect of manufacturing a multilayer core containing an outside core 2a made from PGA resin by the method of the present invention which uses the insert molding method will be described in reference to FIG. 3.

Figure 3:
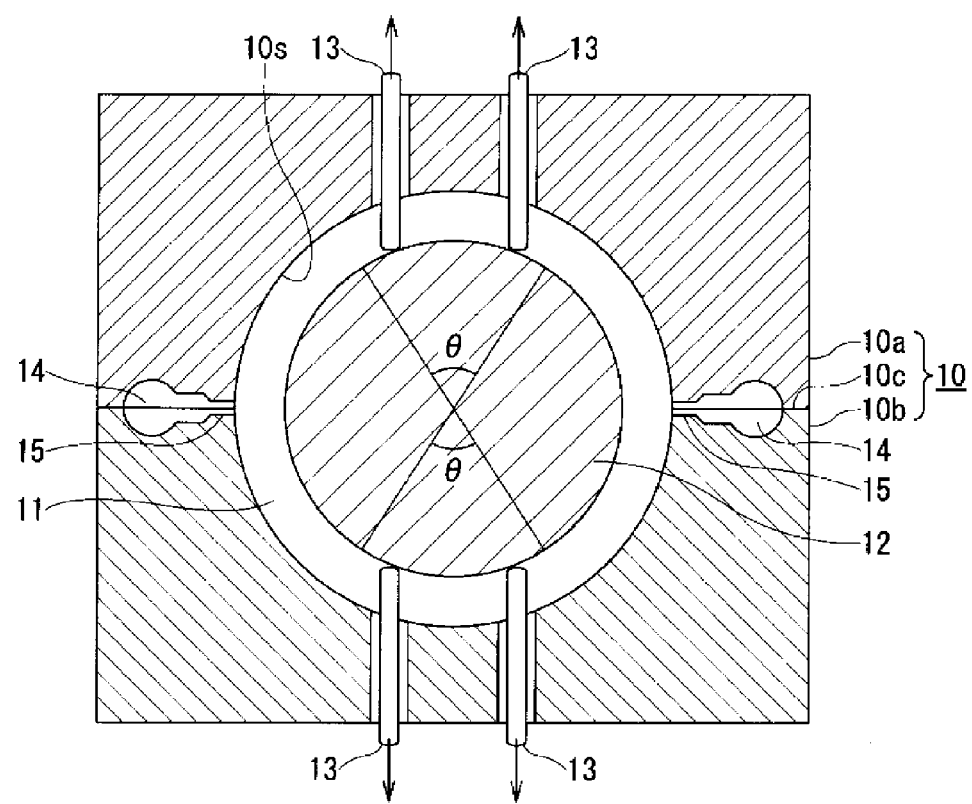
FIG. 3 is a schematic cross-sectional view of a mold in an intermediate stage of frac ball manufacturing according to an aspect of the present invention.

FIG. 3 is a schematic cross-sectional view of a mold 10 in an intermediate stage of an aspect of the present invention. A spherical inside core 12 (2b of FIG. 2) disposed inside a cavity 11 in the open state of a mold 10, which consists of an upper die 10a and a lower die 10b, is held by a plurality of support pins 13 which protrude in the vertical direction as illustrated in the drawing in the closed state of the mold 10, in which the upper die 10a and lower die 10b are joined with a boundary surface 10c interposed. In this state, melted PGA resin is injected into the cavity 11 via a runner 14 and gate 15 of the mold, and at the same time that injection is complete (that is, immediately before injection is complete or at substantially the same time), the tips of the plurality of support pins 13 are retracted in the directions of the arrows from their respective core support positions illustrated in the drawing, and when injection is complete, retraction to the position of the inner surface 10s of the mold is substantially complete.

After that, the molded article is cooled and crystallized in the mold. The mold temperature may be any temperature less than the melting point, but from the perspectives of cooling rate and crystallization rate, it is preferably from 50 to 150° C. When less than 50° C., there are the problems that cooling is too fast, the resin does not spread uniformly when injected, the degree of crystallization of the outside of the molded article relative to the inside is low, and uniformity of physical properties is lost. When not less than 150° C., a long time is required for cooling because the crystallization rate is slow.

After that, the mold is opened and the formed laminate molded article is taken out. The molded article may be water-cooled to cool it down as necessary. Furthermore, residual strain may be eliminated and the degree of crystallization may be made uniform by performing heat treatment at 100 to 200° C. for several minutes to several hours as necessary. Additionally, as necessary, slight surface irregularities corresponding to the gate 15, slight surface irregularities that may remain on the part corresponding to the support pin 13, and surface irregularities of the mold line corresponding to the boundary surface may be removed by polishing to finish the molded article to a smooth surface.

The number of support pins 13 is preferably from 3 to 20 each for the upper die 10a and the lower die 10b, and particularly approximately from 3 to 12. All of the support pins are preferably disposed upward and downward from the center of the spherical core such that the tip ends make contact within a range of 90° as the central angle θ. As the support pins, rod-like bodies having a round or slightly elliptical shape with a cross-sectional area of approximately 0.5 to 15 mm$^2$ are preferably used.

Thus, a core 2A of a frac ball, in which the outside core 2a layer made from the above PGA resin is formed on the spherical inside core 2b, is obtained. The material of the inside core 2b may be PGA resin, but, as described above, any degradable material may be used for the inside core 2b, which has low requirements for mechanical strength.

As described above, the thickness of the coating resin layer 3 can vary greatly from 0.05 to 20 mm, depending on the material thereof, and the material and strength of the core 2 or outside core 2a. For a thickness of approximately 1 mm, the constituent resin material may be molded by a method such as repeatedly dip-coating or spray-coating and curing using a solution or dispersion-like paint obtained by combining it with a suitable solvent or dispersion medium. However, to form a coating layer 3 greater than 1 mm in a uniform thickness, it is still preferable to form it by injection molding with the core 2 or 2A as an insert using the insert injection molding method described above in reference to FIG. 3.

Figure 4:
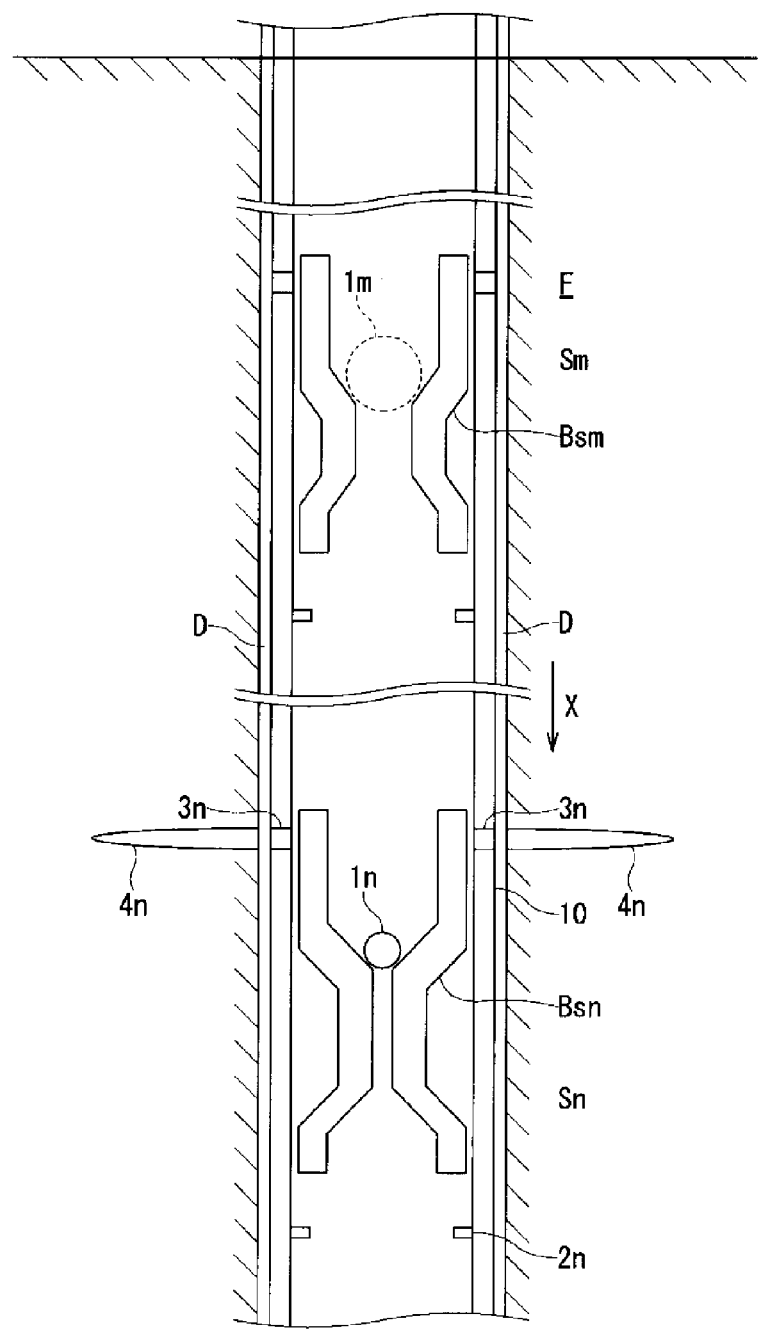
FIG. 4 is a cross-sectional view of a downhole in which a frac sleeve has been inserted, for explaining an example of a fracturing operation performed using a frac sleeve in which the ball sealer (frac ball) of the present invention is incorporated.

One preferred usage mode of the ball sealer (frac ball) for hydrocarbon resource recovery of the present invention is to use it as at least some of the frac balls having a plurality of diameters incorporated in a long frac sleeve. The fracturing operation using such a long frac sleeve will be described in reference to FIG. 4. FIG. 4 is a partial cross-sectional view of a frac sleeve 10 inserted in a downhole (borehole) D formed in a subterranean formation F. It illustrates a ball seat Bsn disposed at the nth position Sn from the tip direction of the frac sleeve 10, and a ball seat Bsm disposed at the mth position (m>n). When performing fracturing using this frac sleeve, a ball 1n with a relatively small diameter is supplied by riding on a water stream introduced along the X direction inside the sleeve, and when it is disposed on the ball seat Bsn, the tip of the ball seat Bsn moves to the position of the downstream stopper 2n due to the water pressure thereof. As a result, a flush hole 3n that was covered by the back edge of the ball seat Bsn is exposed, and perforations 4n for petroleum recovery are formed in the subterranean formation at position Sn by the high-pressure water stream that spurts out via these flush holes 3n. Then, a ball 1 m having a larger diameter than that of the ball 1n is supplied to a position Sm further upstream, and the above fracturing operation is continued. After a series of fracturing operations, the frac balls . . . 1n, . . . 1m, . . . and the like remaining at positions . . . Bsn, . . . Bsm, . . . and the like disintegrate and disappear in a prescribed time according to the disintegrability of the constituent resin thereof under the action of subterranean formation heat and surrounding fluid.

Specifically, in the frac sleeve used in such an aspect, sometimes a long frac sleeve reaching several hundred to several thousand meters formed by adding intermediate tubes is required, and in order to continuously perform a series of fracturing operations using such a long frac sleeve, sometimes a set of numerous frac balls of different diameters, ranging from a small diameter of approximately 12.7 mm (0.5 inches) to a large diameter of approximately 127 mm (5 inches), is required. Therefore, one preferred aspect of application of the present invention is a set of a plurality of frac balls of different diameters in the range of approximately 12.7 mm (0.5 inches) to approximately 127 mm (5 inches), wherein at least some, preferably not less than half, have a diameter not less than approximately 25 mm (1 inch), and include the frac ball of the present invention having a laminate structure. As the remaining smaller-diameter frac balls, a molded ball formed by coating a single-layer core made from an aliphatic polyester such as polyglycolic acid resin as-is, or after coating with the coating resin of the present invention, is preferably used.

EXAMPLES

The present invention will be more specifically described hereinafter based on working examples and comparative examples. The characteristic values in the present specification, including the examples below, are based on values measured by the methods described below.

<Impact Resistance Strength>

A V-notched Izod impact test specimen was created and impact strength was measured in conformance with ASTM-D-256.

<Loading Test>

As a simulation test of durability of a frac ball when a frac ball is seated (loaded) by riding on a high-pressure water stream to a ball seat disposed in a frac sleeve inserted in a borehole, a ball seat (angle of ball bearing surface relative to horizontal is 60°) having an opening 0.25 inches smaller than the diameter of the test ball was set inside a vertical steel pipe of inner diameter 4.5 inches, and a test ball was supplied together with a water stream of 50 barrels/min (approximately 8 m/s as water flow rate), and a loading test was performed. The test was performed three times per test ball, and if no cracks occurred in any of three test balls, it was evaluated as acceptable.

Core Production Example 1

A PGA laminated core having a diameter of 1.5 inches was obtained by substantially the same method as Working Example 1 of WO2014/024827A specification.

Specifically, polyglycolic acid (PGA) (melt viscosity: 600 Pa·s at 270° C., 120 sec$^{-1}$; V-notched Izod impact strength: 27 J/m; manufactured by Kureha Corporation) was supplied to an injection molder ("SAV-100-75" manufactured by Sanjo Seiki Co., Ltd.) and melt-kneaded at a cylinder temperature of 250° C., and a PGA ball having a diameter of 0.5 inches (approximately 13 mm) was obtained using a mold set to 100° C. Then, the 0.5-inch PGA ball 12 produced as above was disposed as an inner-most layer core on three cylindrical support pins 13 having a cross-sectional area of 1.5 mm$^2$ of the lower die 10b of the vertical insert injection molding mold 10 as illustrated in FIG. 3, and the mold was closed by lowering the upper die 10a equipped with three of the same support pins 13, and the PGA ball core 12 was held in substantially the center of the formed cavity 11. In the state illustrated in FIG. 3, the mold temperature was set to 100° C., and the same PGA as above was supplied to the vertical injection molder, melt-kneaded at a cylinder temperature of 250° C., and injected into the 1.5-inch-diameter cavity 11 of the mold. At substantially the same time as injection was complete, the support pins 13 of the upper and lower dies were retracted to the inner surface position of the mold. After injection was complete, it was cooled for 35 seconds while being held in the 100° C. mold, and then the mold was opened, and a 1.5-inch-diameter PGA laminated ball core 1 was obtained by insert molding.

Core Production Example 2

Laminated ball cores 2 having a diameter of 1.5 inches were obtained in the same manner as Core Production Example 1 except that instead of PGA, a mixture of regular grade polylactic acid (PLLA 1; "4032D" manufactured by NatureWorks LLC; notched Izod impact strength: 16 J/m) and powdered talc filler ("Micro Ace L-1" manufactured by Nippon Talc Co., Ltd.; mean diameter: 5 μm) in a weight ratio of 70/30 (notched Izod impact strength of mixture: 15 J/m) was used.

Working Example 1

Frac balls with an elastomer-blended PGA coating layer having a final diameter of 2 inches were produced by performing insert injection molding in substantially the same manner as Core Production Example 1 by using a mold having an inner diameter of 1.5 inches, with the 1.5-inch diameter PGA laminate ball cores 1 obtained in the above Core Production Example as an insert, and instead of PGA alone, using a mixture of PGA and a polybutylene terephthalate-polyether block copolymer ("Hytrel" manufactured by DuPont; V-notched Izod impact strength: did not break; called "Elastomer 1") in a weight ratio of 90/10 (notched Izod impact strength of mixture: 50 J/m).

Working Example 2

Frac balls with a PLLA coating layer having a final diameter of 2 inches were produced by performing insert injection molding in the same manner as Working Example 1 except that as the coating material, impact-resistant grade polylactic acid (PLLA 2; "3801X" manufactured by Nature-Works LLC; weight average molecular weight: 260,000; melting point: 170° C.; notched Izod impact strength: 144 J/m) was used instead of the mixture of PGA/elastomer 1 in a weight ratio of 90/10 that was used in Working Example 1.

Working Example 3

Frac balls with a coating layer having a final diameter of 2 inches were produced by performing insert injection molding in the same manner as Working Example 1 except that as the coating material, biodegradable polybutylene adipate-terephthalate block copolymer ("Ecoflex" manufactured by BASF; notched Izod impact strength: did not break (>500 J/m); called "Elastomer 2") was used instead of the mixture of PGA/elastomer 1 in a weight ratio of 90/10 that was used in Working Example 1.

Working Example 4

Frac balls with a glass fiber-reinforced PGA coating layer having a final diameter of 2 inches were produced by performing insert injection molding in the same manner as Working Example 1 except that as the coating material, a mixture of PGA and glass fiber (GF) ("GL-HF" manufactured by Owens Corning Corporation; short diameter: 10 μm; fiber length: 3 mm) in a weight ratio of 70/30 (notched Izod impact strength of mixture: 115 J/m) was used instead of the mixture of PGA/elastomer 1 in a weight ratio of 90/10 that was used in Working Example 1.

Working Example 5

Frac balls with an aramid fiber-reinforced PGA coating layer having a final diameter of 2 inches were produced by performing insert injection molding in the same manner as Working Example 1 except that as the coating material, a mixture of PGA and aramid fiber ("Technora" manufactured by Teijin Ltd.; short diameter: 12 μm; fiber length: 3 mm) in a weight ratio of 90/10 (notched Izod impact strength of mixture: 120 J/m) was used instead of the mixture of PGA/elastomer 1 in a weight ratio of 90/10 that was used in Working Example 1.

Working Example 6

Frac balls with an impact-resistant grade PLLA coating layer having a final diameter of 2 inches were produced in the same manner as Working Example 2 except that instead of the PGA core, the filler-blended regular grade PLLA core obtained in Core Production Example 2 was used.

Working Example 7

Frac balls with a coating layer of PGA blended with GF and elastomer having a final diameter of 2 inches were produced by performing insert injection molding in the same manner as Working Example 1 except that as the coating material, a mixture of PGA, the GF used in Working Example 4, and the elastomer 1 used in Working Example 1 in a weight ratio of 66/30/4 (notched Izod impact strength of mixture: 68 J/m) was used instead of the mixture of PGA/elastomer 1 in a weight ratio of 90/10 that was used in Working Example 1.

Working Example 8

Frac balls with an impact-resistant PLLA coating layer having a final diameter of 2.5 inches were produced by performing insert injection molding in the same manner as Working Example 1 except that further insert molding of PGA was performed using the 1.5-inch-diameter PGA laminate core obtained by Core Production Example 1 as an inside core, and a 2.0-inch-diameter laminate core having a 0.25-inch-thick PGA outside core was obtained, and this was used as an insert instead of the 1.5-inch-diameter PGA laminate ball core 1, and the impact-resistant grade PLLA 2 used in Working Example 2 was also used.

Comparative Example 1

Frac balls with a PGA coating layer having a final diameter of 2 inches were produced by performing insert injection molding in the same manner as Working Example 1 except that as the coating material, PGA alone was used instead of the mixture of PGA/elastomer 1 in a weight ratio of 90/10 that was used in Working Example 1.

Comparative Example 2

Frac balls with a regular grade PLLA coating layer having a final diameter of 2 inches were produced by performing insert injection molding in the same manner as Working Example 1 except that as the coating material, the regular grade PLLA 1 used in Core Production Example 2 (notched Izod impact strength: 16 J/m) was used instead of the mixture of PGA/elastomer 1 in a weight ratio of 90/10 that was used in Working Example 1.

The coated frac balls of Working Examples 1 to 8 having a coating layer with improved impact resistance obtained as described above did not incur any cracking in the three loading tests described above, whereas the frac balls of Comparative Examples 1 and 2 having a coating layer containing highly rigid PGA as the main component incurred cracking in at least one loading test out of three.

A summary of the working examples and comparative examples described above are shown collectively in the following Table 1.

TABLE 1

| | Working Example 1 | Working Example 2 | Working Example 3 | Working Example 4 | Working Example 5 | Working Example 6 | Working Example 7 | Working Example 8 | Comparative Example 1 | Comparative Example 2 |
|---|---|---|---|---|---|---|---|---|---|---|
| (Inside) core *1 | PGA | PGA | PGA | PGA | PGA | PLLA 1/ filler = 70/30 | PGA | PGA | PGA | PGA |
| Core production example | 1 | 1 | 1 | 1 | 1 | 2 | 1 | 1 | 1 | 1 |
| Diameter (inches) | 1.5 | 1.5 | 1.5 | 1.5 | 1.5 | 1.5 | 1.5 | 1.5 | 1.5 | 1.5 |
| Outside core | — | — | — | — | — | — | — | PGA | — | — |
| Thickness (inches) | — | — | — | — | — | — | — | 0.25 | — | — |
| Coating layer *1 | PGA/ elastomer 1 = 90/10 | PLLA 2 | Elastomer 2 | PGA/GF = 70/30 | PGA/ aramid fiber = 90/10 | PLLA 2 | PGA/GF/ elastomer 1 = 66/30/4 | PLLA 2 | PGA | PLLA 1 |
| Thickness (inches) | 0.25 | 0.25 | 0.25 | 0.25 | 0.25 | 0.25 | 0.25 | 0.25 | 0.25 | 0.25 |
| Final diameter (inches) | 2 | 2 | 2 | 2 | 2 | 2 | 2 | 2.5 | 2 | 2 |
| Loading results | Acceptable | Acceptable | Acceptable | Acceptable | Acceptable | Acceptable | Acceptable | Acceptable | Cracked | Cracked |

*1 Elastomer 1: Polybutylene terephthalate-polyether block copolymer
Elastomer 2: Polybutylene adipate-terephthalate block copolymer
PLLA 1: Regular grade PLLA
PLLA 2: Impact-resistant grade PLLA

INDUSTRIAL APPLICABILITY

According to the present invention, as described above, a ball sealer having a large diameter suitable for use in hydraulic fracturing, which is widely used in recovery of hydrocarbon resources, and having impact resistance to withstand high flow rate loading while maintaining disintegrability after fracturing is provided, and an efficient method for manufacturing it and a borehole treatment method (fracturing method) using it are also provided.

The invention claimed is:

1. A ball sealer for hydrocarbon resource recovery comprising:
a spherical core having at least one layer comprising a disintegrable aliphatic polyester resin and a coating layer deposited on the outer surface of the spherical core;
wherein the coating layer comprises a resin material having higher impact resistance than the aliphatic polyester resin and wherein the resin material consists of a mixture of an aliphatic polyester resin and a polyester-based elastomer, and
a diameter of the ball sealer is not less than 25.4 mm (1 inch).

2. The ball sealer according to claim 1, wherein the disintegrable aliphatic polyester resin is an aliphatic polyester resin that has been reinforced with a filler.

3. The ball sealer according to claim 1, wherein the disintegrable aliphatic polyester resin is a polyglycolic acid resin.

4. The ball sealer according to claim 2, wherein the disintegrable aliphatic polyester resin is a polylactic acid that has been reinforced with a filler.

5. The ball sealer according to claim 1, wherein the coating resin material comprises a disintegrable aliphatic polyester resin.

6. The ball sealer according to claim 5, wherein the coating resin material comprises a polylactic acid.

7. The ball sealer according to claim 1, wherein the spherical core has a two-layer structure of an outside core and an inside core, the outside core comprising a disintegrable aliphatic polyester resin, and the inside core comprising a disintegrable material other than a polyglycolic acid resin.

8. The ball sealer according to claim 1, wherein the coating layer does not contain fibers.

9. The ball sealer according to claim 1, wherein the coating layer does contain fibers.

10. The ball sealer according to claim 1, wherein the coating layer consists of said resin material.

11. The ball sealer according to claim 1, wherein the coating layer consists of said resin material and said fibers.

* * * * *